US011663500B2

(12) United States Patent
Rogers et al.

(10) Patent No.: US 11,663,500 B2
(45) Date of Patent: May 30, 2023

(54) VISUALIZING CYBERSECURITY INCIDENTS USING KNOWLEDGE GRAPH DATA

(71) Applicant: International Business Machines Corporation, Armonk, NY (US)

(72) Inventors: Elizabeth Margaret Rogers, Austin, TX (US); Andrea Lozano, Austin, TX (US); Terra Lynn Banal, Austin, TX (US); Ilgen Banu Yuceer, London (GB); James Loughran, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 16/866,691

(22) Filed: May 5, 2020

(65) Prior Publication Data

US 2021/0350248 A1    Nov. 11, 2021

(51) Int. Cl.
*H04L 9/40*    (2022.01)
*G06N 5/022*   (2023.01)
*G06N 5/02*    (2023.01)

(52) U.S. Cl.
CPC ............ *G06N 5/022* (2013.01); *G06N 5/027* (2013.01); *H04L 63/1408* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 6,226,408 B1 | 5/2001 | Sirosh | |
| 6,380,937 B1 | 4/2002 | Dong et al. | |
| 6,480,194 B1 | 11/2002 | Sang'udi et al. | |
| 8,881,288 B1 | 11/2014 | Levy et al. | |
| 8,972,899 B2 | 3/2015 | Carlsson et al. | |
| 10,673,880 B1* | 6/2020 | Pratt | H04L 63/1433 |
| 2003/0084340 A1 | 5/2003 | Schertz et al. | |
| 2017/0289187 A1 | 10/2017 | Noel et al. | |
| 2018/0316706 A1* | 11/2018 | Tsironis | H04L 63/1408 |
| 2019/0124104 A1* | 4/2019 | Apostolopoulos | H04L 63/1425 |
| 2019/0132344 A1* | 5/2019 | Lem | G06N 5/022 |

(Continued)

OTHER PUBLICATIONS

Bass, "Intrusion detection systems and multisensor data fusion: Creating cyberspace situational awareness." Communications of the ACM 43.4 (2000): 99-105.

(Continued)

*Primary Examiner* — Anh Vu H Ly
(74) *Attorney, Agent, or Firm* — Harrington & Smith

(57) ABSTRACT

Information for a knowledge graph is accessed. The knowledge graph has nodes and edges of a network and has information about security incident(s) in the network. Related entities from the knowledge graph are grouped together, where the related entities that are grouped together are determined not only by types of the entities, but also by threat(s) impacting the entities. The threat(s) correspond to the security incident(s). The grouped related entities are arranged in visualization data in order that the visualization data are configured to provide a visualization of the knowledge graph with the grouped related entities. The visualization data are output. Methods, apparatus, and computer program products are disclosed.

20 Claims, 12 Drawing Sheets

(56) References Cited

U.S. PATENT DOCUMENTS

| | | |
|---|---|---|
| 2019/0156257 A1 | 5/2019 | Datta Ray |
| 2019/0166139 A1* | 5/2019 | Ochi .................... H04L 63/145 |
| 2019/0182273 A1* | 6/2019 | Walsh ................ H04L 63/1441 |
| 2020/0244673 A1* | 7/2020 | Stockdale ............... H04L 41/40 |
| 2020/0304462 A1* | 9/2020 | Kopp .................... H04L 63/145 |
| 2021/0273961 A1* | 9/2021 | Humphrey ............ H04L 43/028 |
| 2021/0326744 A1* | 10/2021 | Israel .................... G06N 20/00 |

OTHER PUBLICATIONS

Han et al. "System Architecture and Key Technologies of Network Security Situation Awareness System YHSAS." CMC—Computers Materials & Continua 59.1 (2019): 167-180.

Swimlane—Security automation orchestration and response downloaded on May 5, 2020. https://swimlane.com/solutions/security-automation-and-orchestration/.

NGX—Graph Introduction, a graph visualization library used by Swimlanes. Downloaded on May 5, 2020. https://swimlane.github.io/ngx-graph/.

Introduction to A*, downloaded on Mar. 2, 2020, http://theory.stanford.edu/~amitp/GameProgramming/AStarComparison.html.

* cited by examiner

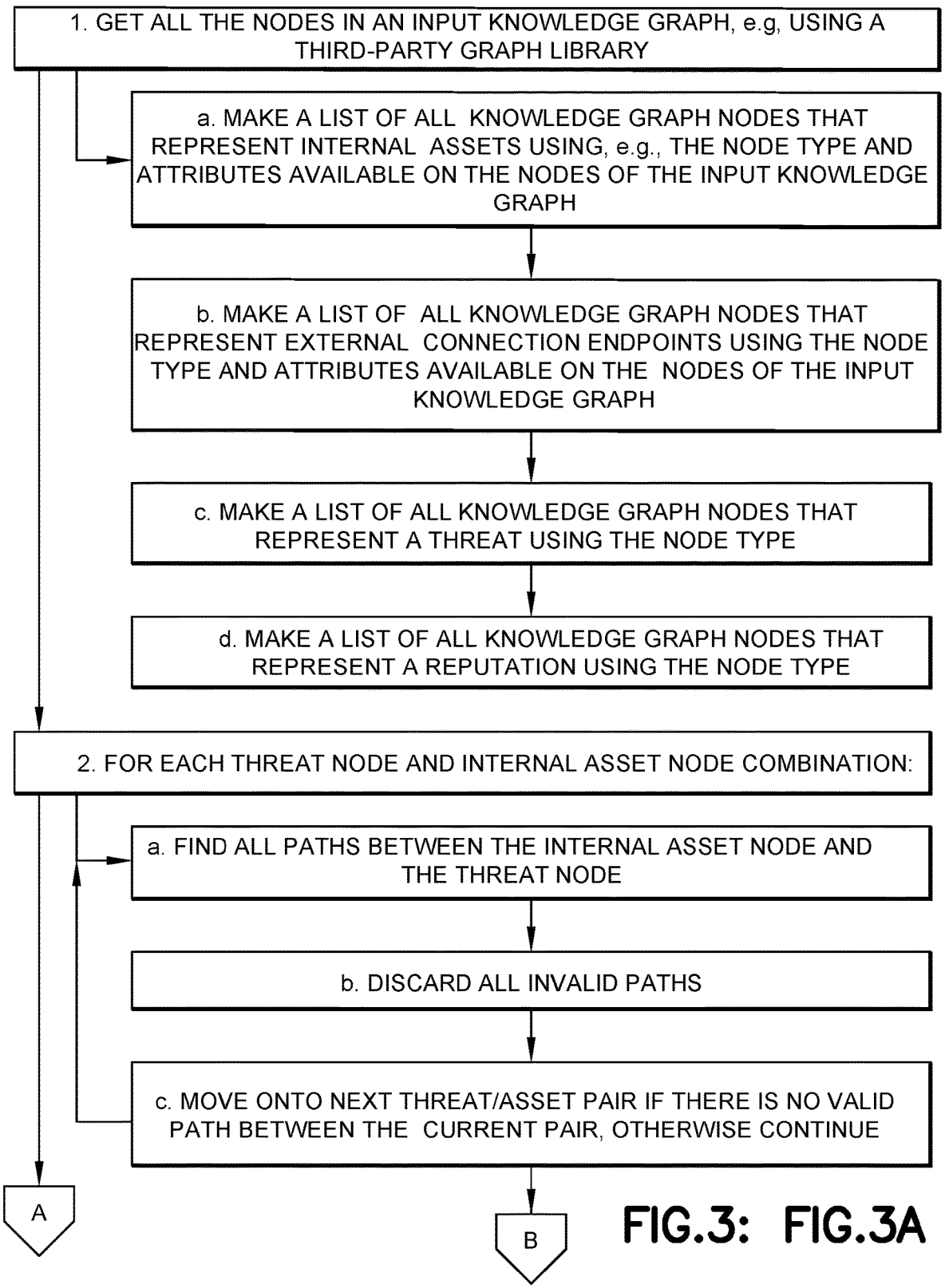
FIG.3: FIG.3A

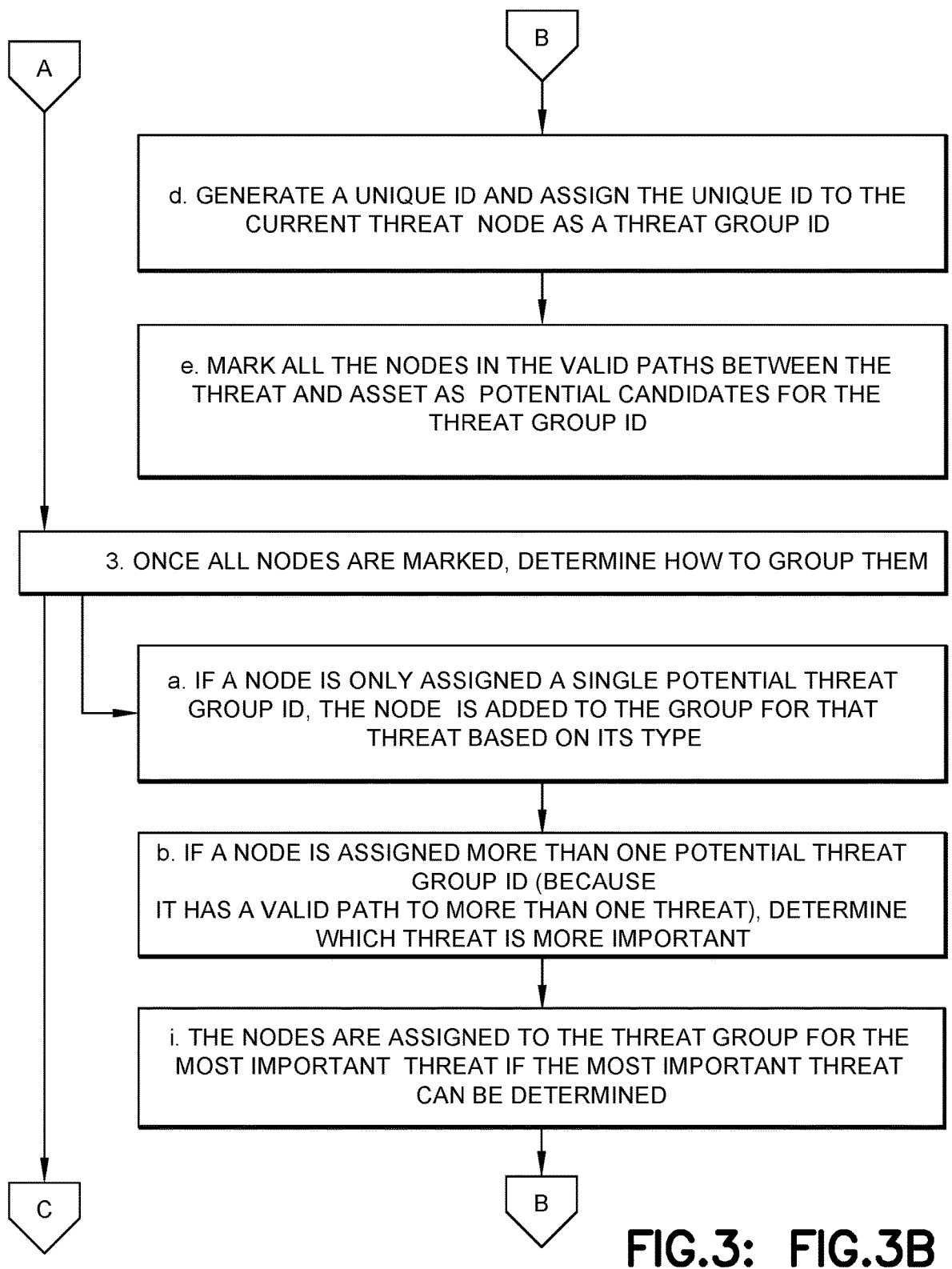
FIG.3: FIG.3B

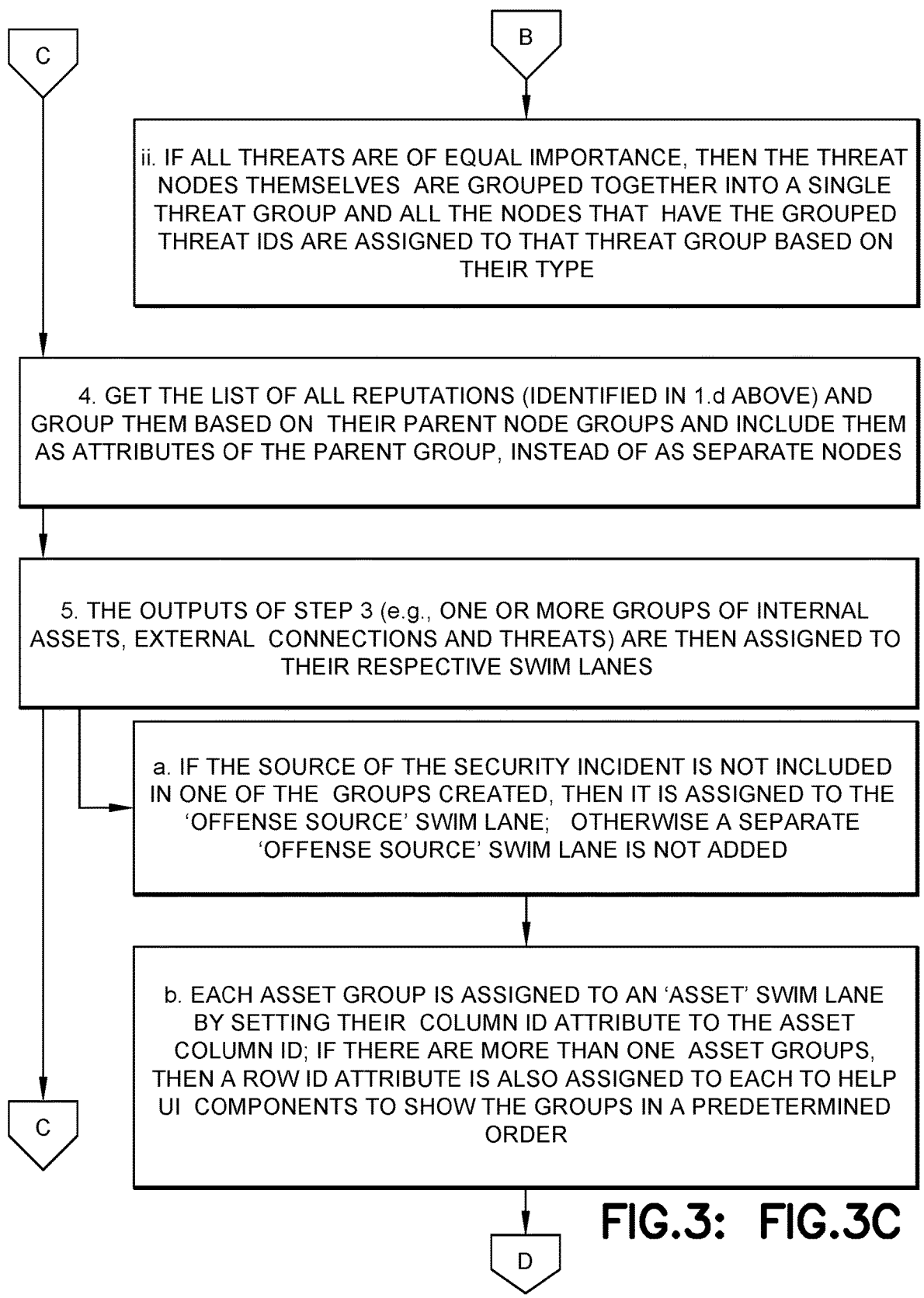
FIG.3: FIG.3C

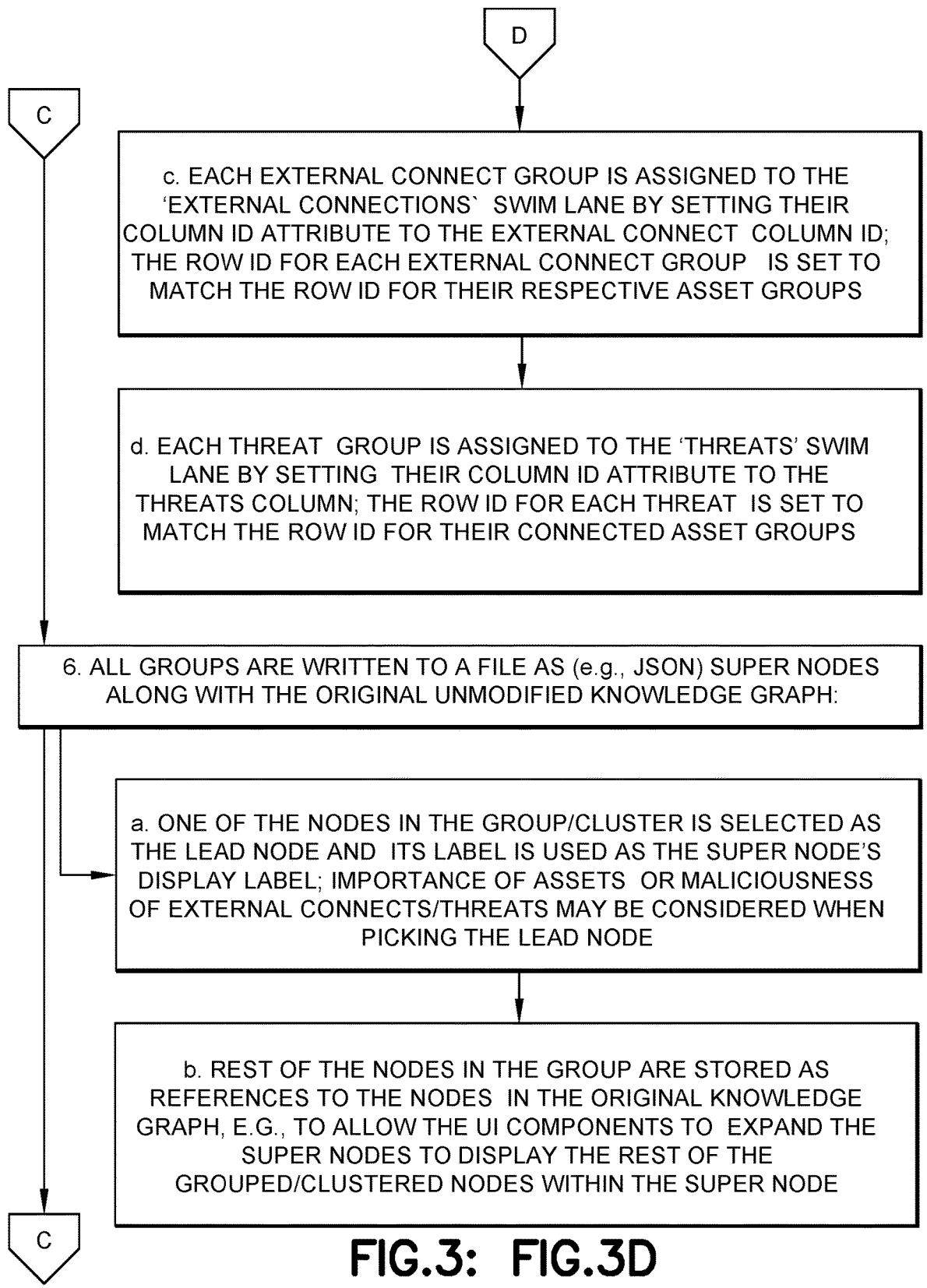
FIG.3: FIG.3D

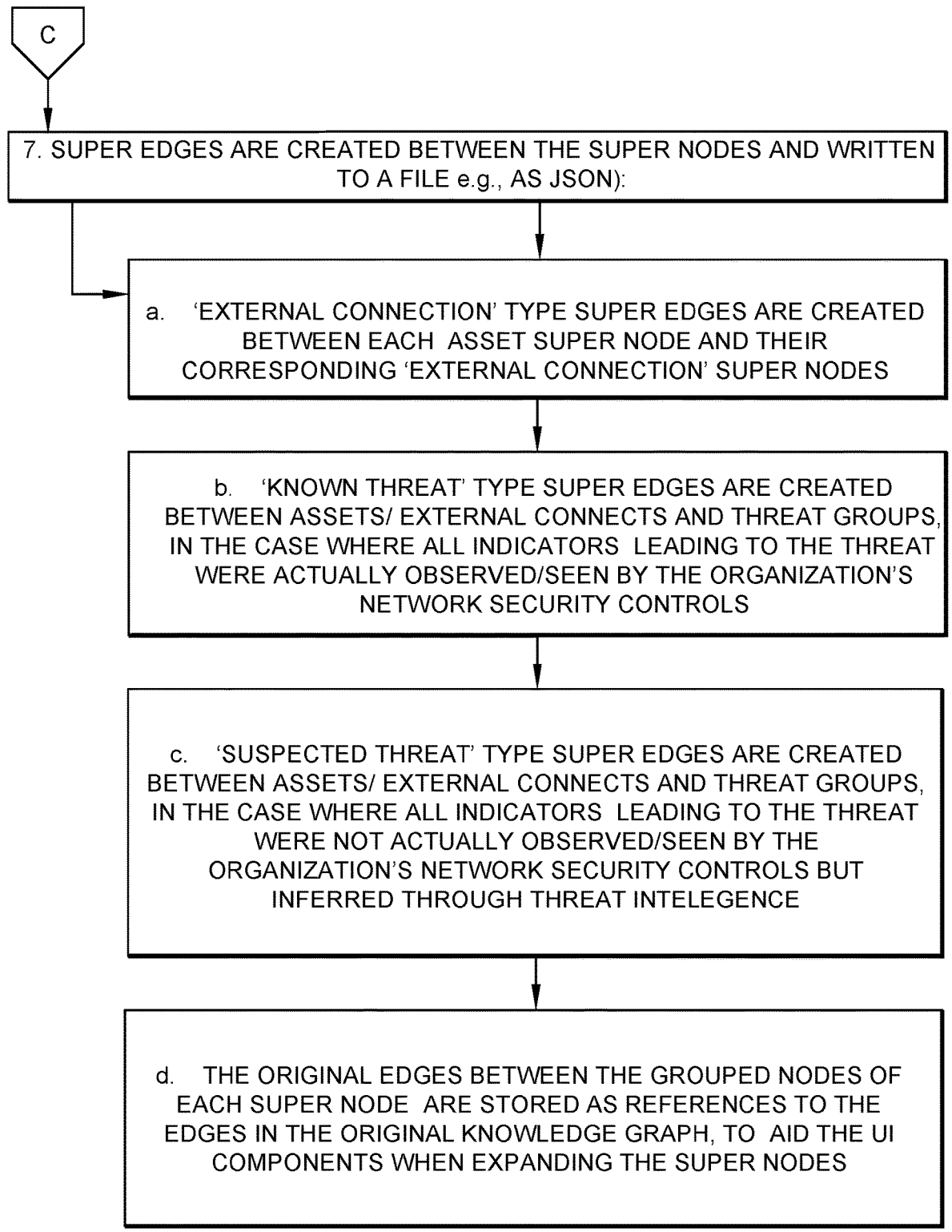
FIG.3: FIG.3E

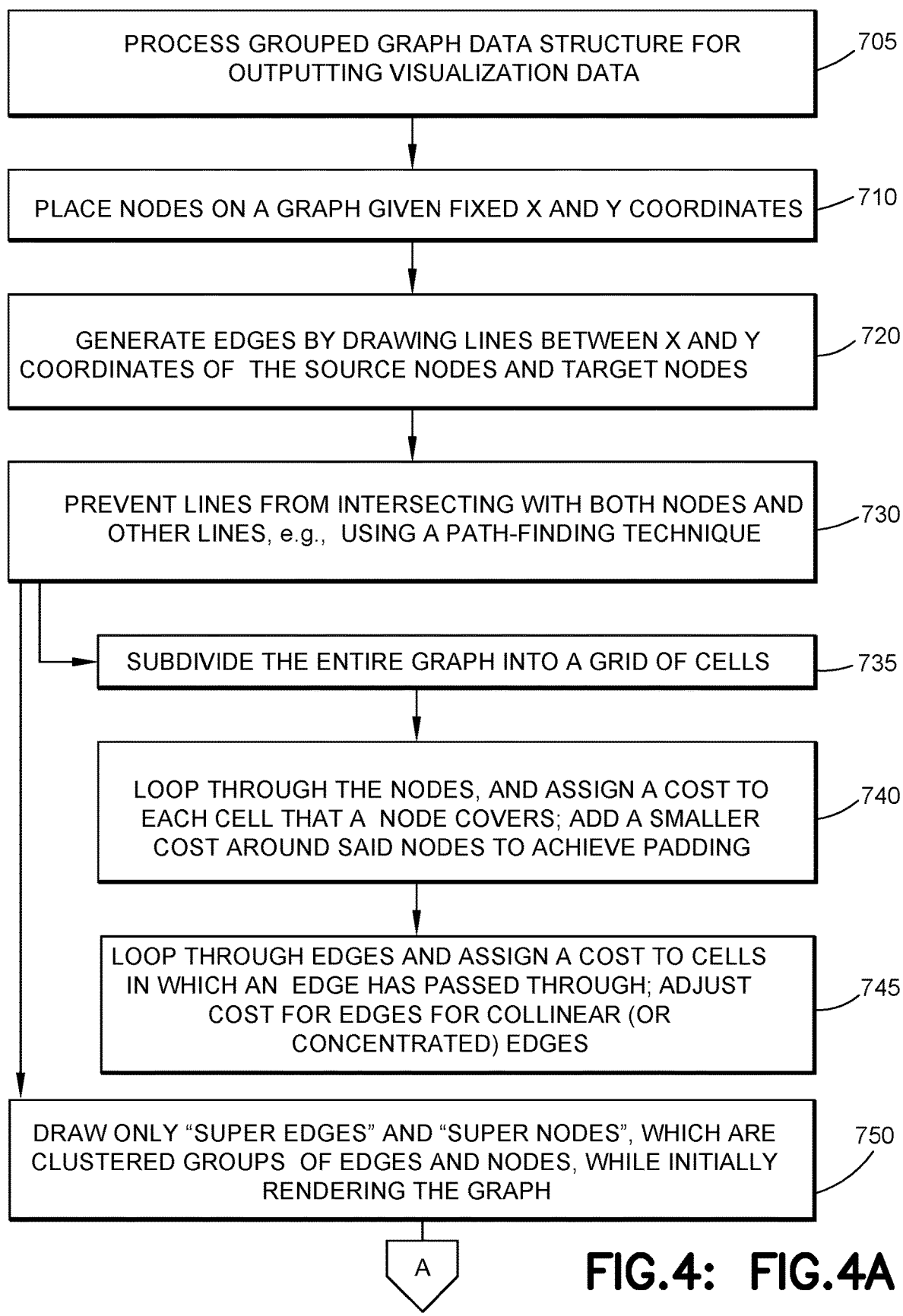
FIG.4: FIG.4A

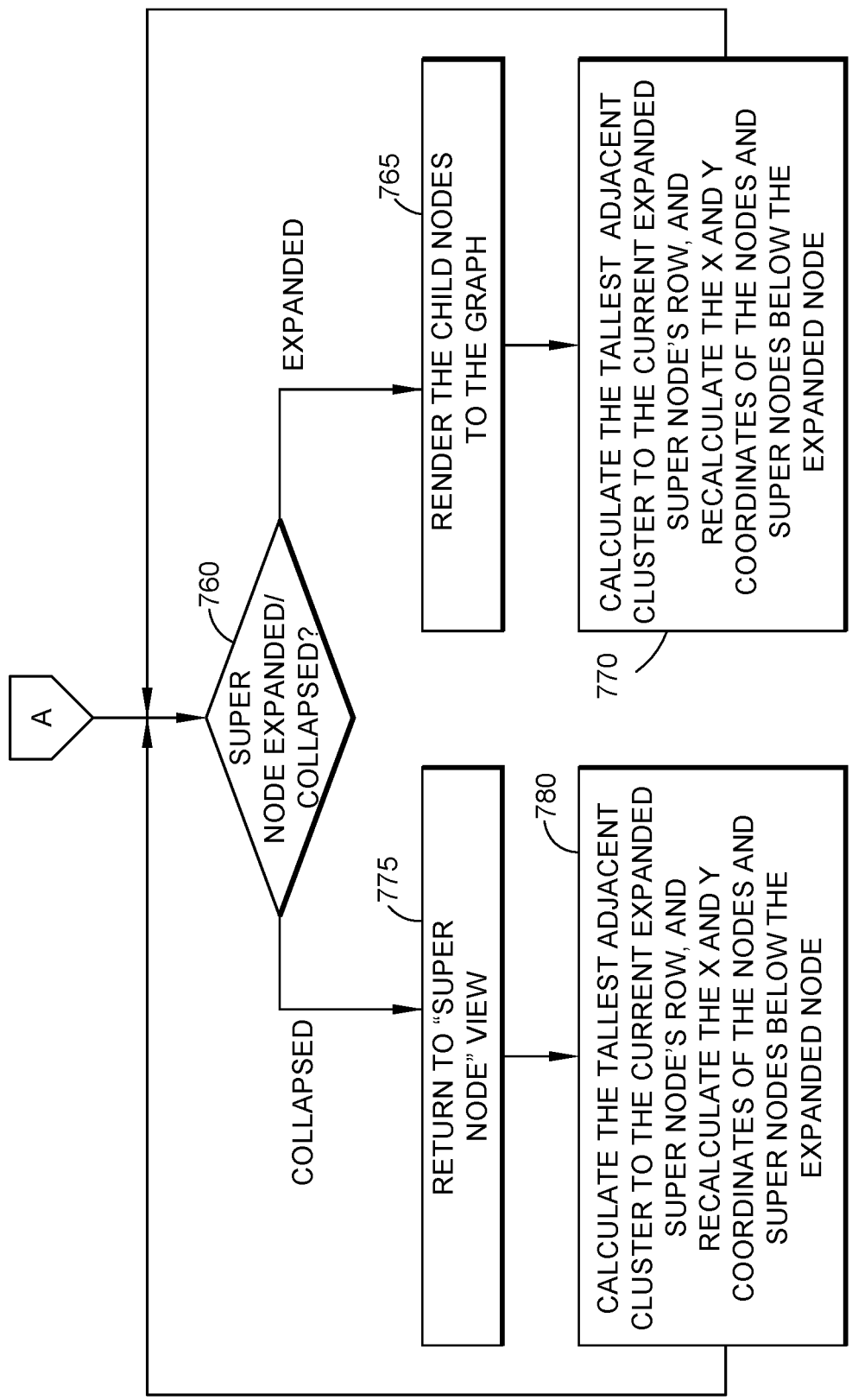
FIG.4: FIG.4B

VISUALIZING CYBERSECURITY INCIDENTS USING KNOWLEDGE GRAPH DATA

BACKGROUND

This invention generally relates to security for computer networks and, more specifically, relates to visualizing cybersecurity incidents using knowledge graph data.

Enterprise security teams use a range of technologies, software, and processes to help them collect, monitor, and analyze data for evidence of possible network intrusions.

Knowledge graphs are powerful tools that can be used to show all of the entities (e.g., nodes) related to a cybersecurity incident (e.g., internal hosts, servers, users, external hosts, web sites, malicious files, malware, threat actors, and the like) and the relationships, e.g., edges) between these entities.

Users of security incident knowledge graphs find these graphs very difficult to interpret, due to the absence of a structured flow through the nodes and edges. For instance, there is no easy way to follow the path from the source of the incident to the possible threat, due to the many interrelated branches. In addition, knowledge graphs can get very complicated, even for moderately complicated security incidents, which can include hundreds of nodes and edges. One interviewed security analyst described a knowledge graph as "this big spider web" that "displays too much data in a format that isn't clear."

Users of security incident knowledge graphs need to be able to quickly assess if a breach or compromise has occurred (or has not, despite the presence of malicious observables in the network) and identify what internal assets were impacted by what threat, tasks that are not easy or are not possible with the traditional knowledge graph.

SUMMARY

This section is meant to be exemplary and not meant to be limiting.

In an exemplary embodiment, a method includes accessing information for a knowledge graph, the knowledge graph having nodes and edges of a network, and having information about one or more security incidents in the network. The method includes grouping together related entities from the knowledge graph, where the related entities that are grouped together are determined not only by types of the entities but also by one or more threats impacting the entities. The one or more threats correspond to the one or more security incidents. The method includes arranging the grouped related entities in visualization data in order that the visualization data are configured to provide a visualization of the knowledge graph with the grouped related entities. The method further includes outputting the visualization data.

A further exemplary embodiment is an apparatus, comprising one or more memories having computer-readable code thereon and one or more processors The one or more processors, in response to retrieval and execution of the computer-readable code, causing the apparatus to perform operations comprising: accessing information for a knowledge graph, the knowledge graph having nodes and edges of a network and having information about one or more security incidents in the network; grouping together related entities from the knowledge graph, where the related entities that are grouped together are determined not only by types of the entities, but also by one or more threats impacting the entities, wherein the one or more threats correspond to the one or more security incidents; arranging the grouped related entities in visualization data in order that the visualization data are configured to provide a visualization of the knowledge graph with the grouped related entities; and outputting the visualization data.

Another exemplary embodiment is a computer program product comprising a computer-readable storage medium having program instructions embodied therewith. The program instructions are executable by a computer system to cause the computer system to perform operations comprising: accessing information for a knowledge graph, the knowledge graph having nodes and edges of a network and having information about one or more security incidents in the network; grouping together related entities from the knowledge graph, where the related entities that are grouped together are determined not only by types of the entities but also by one or more threats impacting the entities, wherein the one or more threats correspond to the one or more security incidents; arranging the grouped related entities in visualization data in order that the visualization data are configured to provide a visualization of the knowledge graph with the grouped related entities, and outputting the visualization data.

BRIEF DESCRIPTION OF THE SEVERAL VIEWS OF THE DRAWINGS

FIG. 3, split into FIGS. 3A, 3B, 3C, 3D, and 3E is a method of processing input knowledge graph data to make the data more useful for subsequent visualization via a grouped graph data structure, in accordance with an exemplary embodiment;

FIG. 4, split into FIGS. 4A and 4B, is a method of laying out nodes and edges to create a knowledge graph visualization, in accordance with an exemplary embodiment;

DETAILED DESCRIPTION

Figure 1:
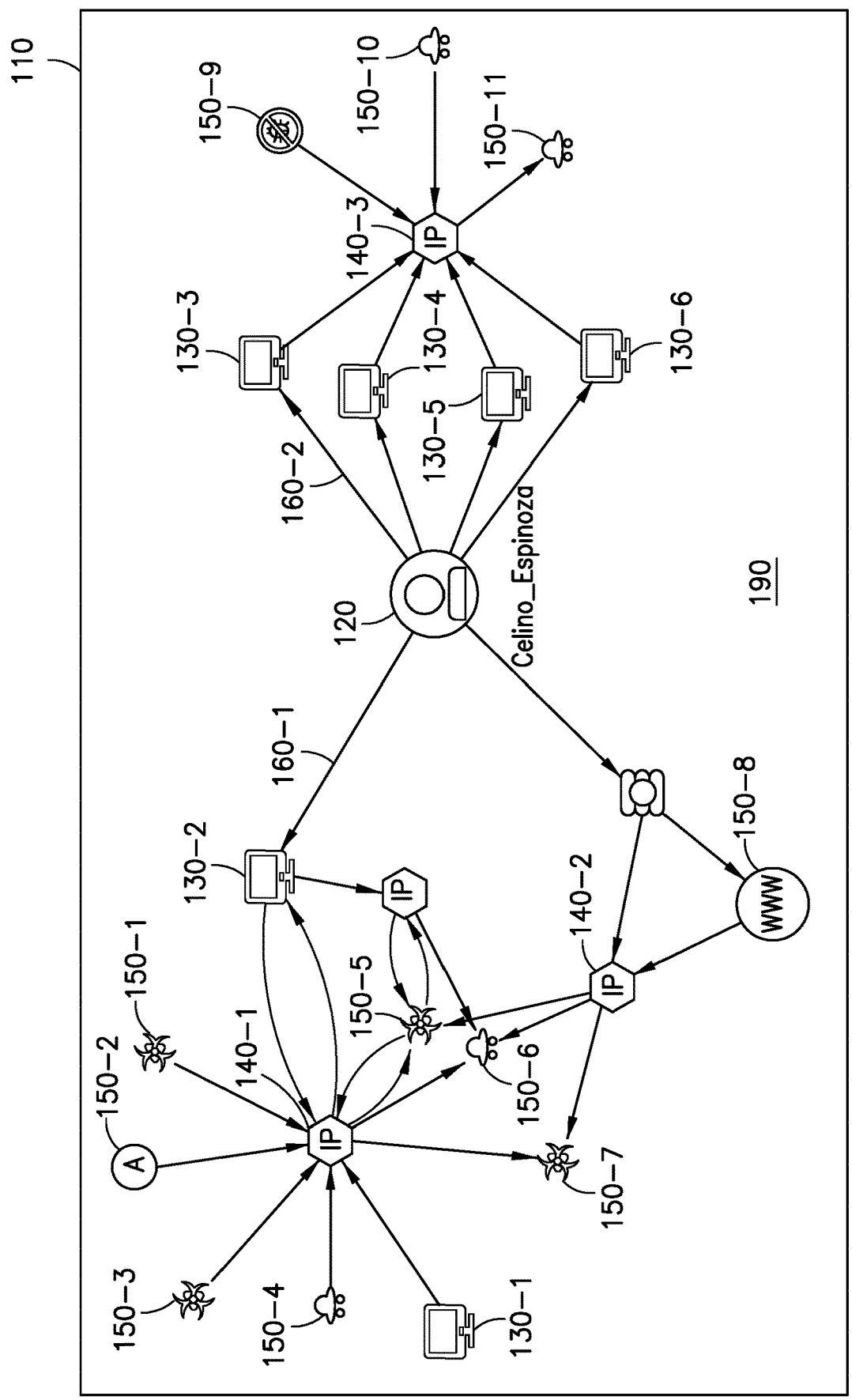
FIG. 1 depicts a knowledge graph visualization of a simple security incident investigation.

The following abbreviations that may be found in the specification and/or the drawing figures are defined as follows:

AI Artificial Intelligence
AV AntiVirus
HTML Hyper-Text Markup Language
id identification
IP Internet Protocol
JSON JavaScript Object Notation
KG Knowledge Graph
NLP Natural Language Processing
OS Operating System
SIEM Security Information and Event Management Tool
SOC Security Operation Center
UI User Interface
URL Universal Resource Locator The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary embodiments herein include a new way of organizing and visualizing a security incident knowledge graph. One exemplary goal is to allow users of a security incident knowledge graph—typically security analysts—to quickly identify if a compromise has occurred, the breadth of the attack, the internal assets that have been (or potentially have been) impacted by a threat, and the type of threat impacting the assets.

In contrast to a traditional knowledge graph, the exemplary embodiments herein may perform one or more of the following:

1) Reduce the complexity of the knowledge graph by clustering related entities together, where related entities that can be clustered together are determined not only by the type of the entities but also by the threats impacting the entities;

2) Allow the security analysts to selectively expand clusters they would like to see more details on; or 3) Provide an easy-to-follow path starting from the source of the security incident—typically a user or an internal asset or an external entity—and leading to the threat that allows the security analyst to quickly identify how the security breach proceeded through their network.

Before proceeding with additional details regarding the exemplary embodiments, it is helpful to provide an overview of the technical area and the issues in the area that drove the inventors to create the technical solutions herein.

Security workers—analysts and leaders—may have a work environment referred to as Security Operation Centers (SOCs). SOCs are typically staffed by experienced teams of security analysts and engineers, incident responders, and managers who oversee security operations. They tend to be rather imposing, dark spaces filled with security team members in their own workspaces, surrounded by at least two, if not three screens. These teams are responsible for protecting company assets from security threats, which they do by monitoring, detecting, investigating, and responding to potential security breaches. Security operations teams use a range of technologies, software, and security processes to help them collect, monitor, and analyze data for evidence of possible network intrusions. Such software applications are designed to help analysts focus on the most critical threats to their network, investigate these threats more quickly, and identify possible breaches that weren't identified by other tools.

Building enterprise security software requires deep knowledge of information technology, the software development process, and the cybersecurity industry. While product teams need to understand the practices, experiences, and goals of their intended users, they also need to understand the technology behind the software. This can be particularly challenging for designers and design researchers who don't come from a computer science background. As a result, it is not unusual for designers and design researchers to spend significant time when starting a project trying to understand what the software they work on is supposed to help users accomplish and how.

The introduction of designers and design researchers to development teams, however, has proved to be just as challenging for software developers and product managers who are not accustomed to being asked to think about their users' "as-is" experience of their product, complete with pain points and opportunities for improvement.

For reasons described in more detail below, while knowledge graphs have many benefits, the currently available representations are complicated to parse, difficult to use, and not especially clear in the insights that they provide to analysts.

Companies employ SIEM (Security Information and Event Management Tool) solutions to monitor their environment for real-time threats and catch abnormal behavior and possible cyberattacks. A SIEM works by collecting and normalizing log and flow data coming from network infrastructure, security devices, and applications and comparing this data to pre-defined rulesets. If the conditions of a rule are met, SIEM generates a security alert. These alerts often are the first clue that there may have been unauthorized access and use of enterprise assets. Unfortunately, many of the alerts that are triggered by SIEMs are false alarms, and security analysts spend much time trying to ascertain if the alert is a true alert or a false positive.

SIEMs can employ various tools and software to help security analysts quickly reach a decision on what to do next after receiving one of these security alerts. These tools execute data mining and analytics and collect data related to the alert from the logs available on the SIEM, such as logs from network devices and security devices like firewalls and antivirus devices, and correlates this data with external threat intelligence and visualize the findings as a knowledge graph. Knowledge graphs are powerful tools that can be used to show all of the entities (nodes) related to a security incident (e.g., internal hosts, servers, users, external hosts, web sites, malicious files, malware, threat actors, and the like) and the relationships (edges) between these entities. Knowledge graphs, however, can get quite complicated, especially as security incidents can involve hundreds of nodes and edges. This is illustrated in more detail below.

For SOCs, it has been determined that limited adoption and usage of tools that provide alert visualizations via knowledge graph was the result of not one but several factors. One such determining factor was that security analysts did not see value in knowledge graphs because the graphs were confusing and didn't present information in a way that answered the questions analysts pose in determining the nature and extent of a possible breach.

On the one hand, security analysts' decision not to launch an alert investigation via these tools can be seen to be the result of their interpretation of these tools work and the information they provide. On the other hand, the research also suggests that analysts are hesitant to use these tools because of the complexity of the knowledge graph and their difficulty in knowing how to use and interpret the contained information.

Analysts want a solution that brings together all of the disparate information they usually have lookup manually and presents it in such a way that they can quickly answer questions such as the following:

1) Was a connection made from inside the network (by a computer, a device, an application, and the like) to an IP or URL that is associated with threat actors and attacks, or was it blocked?

2) If a connection was made, is it a local-local connection or a local-external connection?

3) If a local-external connection was made, what local assets are involved, and are they critical assets (e.g., the computer of the company's Chief Financial Officer)?

4) If a local-external connection was made, was malware actually executed by a user?

5) What type of attack (e.g., malware, phishing, denial of service) is being used against the network?

6) Is this an evolving attack or something that has been contained?

This set of questions determines the workflow of analysts, as seen by one analyst's narration of the information that he was looking for while he was using SIEM to investigate a security incident:

"Was a connection between the remote host (and malicious observable) and the local host made, or was it blocked? If it was blocked, is the system still trying to connect to it (e.g., it's a botnet CnC)? Is the local asset infected? What is the local asset that is in connection with the malicious observable? Who is the user? Was a payload locally executed? If executed, which assets have been compromised, in order of priority? What has happened over the past seven days? Are new events being added to an offense?" (It should be noted that "offense" is one term for a security alert or other potential security incident.)

In asking these questions, security analysts are attempting to quickly understand the following:

1) If a breach has occurred or not.

2) The source of the breach.

3) The assets that have been affected and how critical they are.

4) The kind of attack they are dealing with.

5) How widespread the attack is.

Together these variables allow an analyst to "put together the trail to determine what happened or caused the issue." Very few security analysts could answer the questions listed above with the currently available knowledge graph visualizations. As a result, they could not quickly come to an understanding of the security incident.

To further illustrate this, FIG. 1 depicts a knowledge graph visualization of a simple security incident investigation. A graph portion 110 of a window illustrates a knowledge graph 190 comprising nodes 120, 130, and 150 and edges 160 between the nodes. For clarity purposes, only two edges are marked: edge 160-1 between nodes 130-2 and 120; and edge 160-2 between node 120 and node 130-3. In this example, all the nodes are also icons.

FIG. 1 depicts a security incident that can be summarized as follows: six different local assets (the nodes/icons 130-1 through 130-6) associated with user Celino Espinoza (the node/icon 120 in the middle) have reached out to three different IP addresses (nodes 140-1, 140-2, and 140-3). In one case, it appears that a user went to a suspicious URL that is hosted on one of these IP addresses 140. All of the IP addresses in the graph show evidence of connection (and possible compromise), e.g., via edges, to a whole set of suspicious entities (all of nodes/icons 150-1 through 150-11) like malware, a threat campaign, threat actors, and a virus. Clicking on any of these icons will pull up additional information about that node that can be used by an analyst to understand how critical the threat is. Clicking on any of the lines (edges 160) connecting the nodes/icons will bring up information about the nature of the relationship between two entities. Hovering over the IP addresses 140 will bring up a geolocation map of where the IP address is registered and physically located.

The input knowledge graph 190 is generated by analyzing the events from the STEM that reported the security incident, extracting observables/indicators from the events to make up the nodes of the graph, and enriching the graph 190 with indicator nodes from internal/external threat intelligence. The generation of the original knowledge graph 190 is not part of the exemplary embodiments herein, though it could be. Instead, exemplary embodiments take the already generated knowledge graph 190 and restructure the graph to allow the graph to be visualized in a manner to achieve one or more goals described above and help a security analyst quickly identify a breach or compromise.

The input knowledge graph 190 can contain nodes that represent internal network assets (e.g., IP addresses representing servers, desktops, mobile devices belonging to the organization that the security incident is reported for), nodes that represent external connection endpoints such as IP Addresses, Domains, and URLs, nodes that represent internal users, nodes that represent Files/File hashes that have been detected on the internal network assets or identified via threat intelligence to be relevant to the incident, nodes that show the reputation/category of external connection endpoints (Spam Generator, Malware Distributor, valid business, and the like), nodes that represent a threat such as a Malware Family, Threat Actor, Threat Campaign or an Antivirus Signature that's known to detect the particular threat.

The edges 160 between each node in the input knowledge graph represent the relationship of nodes to each other. There are multiple possible types of edges, such as a CONNECT edge between two IP address nodes indicates that a connection from the source node to destination node was observed. A RESOLVE edge between an IP address and domain node indicates that domain name resolves to that IP address. A CONTAINS edge between an IP address and a File node indicates that File has been observed on that host. A USES edge between an IP address and User/Person node indicates that the user has logged onto or has been using that host.

The input knowledge graph 190 also contains a root node 120 identified via an attribute on the node (e.g., is_root=true). The root node 120 of the graph indicates the source of the security incident. That is, the root node may be identified as a source of a security incident, and multiple insights can be indicated about the incident.

One of the issues associated with information such as that displayed in FIG. 1, however, is a difficulty in easily understanding the depth and scope of a cybersecurity incident. To address this, the inventors created objectives, one of which was the following: A security analyst can view what really happened in their network for a potential incident and complete triage more efficiently.

That is, while the graph 190 provides a lot of useful information, analysts were not confident that it would help them quickly determine if an alert was a true alert or a false positive and what their next steps should be. Analysts specifically mentioned the following as limitations of the current knowledge graph 190:

1) The graph does not clearly indicate the entity that is the source of the offense or attack: i.e., where the attack entered the network.

2) The graph does not clearly distinguish between which entities are inside of the network and which ones are outside of the network.

3) It is not apparent what was blocked and what wasn't, what was downloaded and executed versus simply downloaded, making it difficult for the analyst to recognize and prioritize immediate threats over potential threats.

4) The graph does not clearly indicate which potentially compromised machines are the most valuable, vulnerable, or critical.

Because of these limitations, analysts were often unclear about the investigation's value proposition, regardless of the marketing materials for the software. Was the graph there to help them find the "root cause for an action" and thus save them valuable investigation time? Or was it possible that the software was doing the entire investigation of the source offense for them? Was the software for visualizing cybersecurity incidents helping them identify additional indicators of compromise outside of an offense that they would have missed without seeing them on the graph?

In fact, security analysts with little to no experience with these alert investigation tools characterized the existing knowledge graph as "this big spider web" that "displayed too much data in a format that wasn't clear." For them, the knowledge graph is an intimidating artifact that is difficult to interpret and hard to verify.

To address this and other goals, the inventors who created a new knowledge graph visualization, as described herein, had the desire to create something that would help analysts "connect the dots" so that the analysts could tell the story of what had happened. The inventors recognized that the previous visualization, while technically correct, was not very consumable, nor did it meet the goals the inventors had for themselves for designing for AI. By contrast, and as an overview, the following material describes an exemplary utility to process an existing security incident knowledge graph to generate a new grouped graph data structure that can be used to achieve exemplary solutions described herein. The data structure and visualization techniques help solve the problems indicated above.

Designers use metaphors to explain the new and unfamiliar in terms that people—users—understand. If the existing visualization of the knowledge graph brings to mind the complexity of the Internet and the "black box" nature of AI, what then is an appropriate metaphor for a new visualization, the inventors wondered.

After much experimentation, the inventors landed on a metaphor closer to how security professionals themselves explain their process and what it is that they do—a puzzle. Puzzles are composed of many pieces, some of which fit together, others that don't, and still others that might be missing. Their job, the designers explained, was to present analysts with all of the pieces of the puzzle that were available (e.g., the rule that triggered the offense, user and asset information, threat intelligence, malicious observables) and let analysts "fill in the empty gaps."

Figure 2:
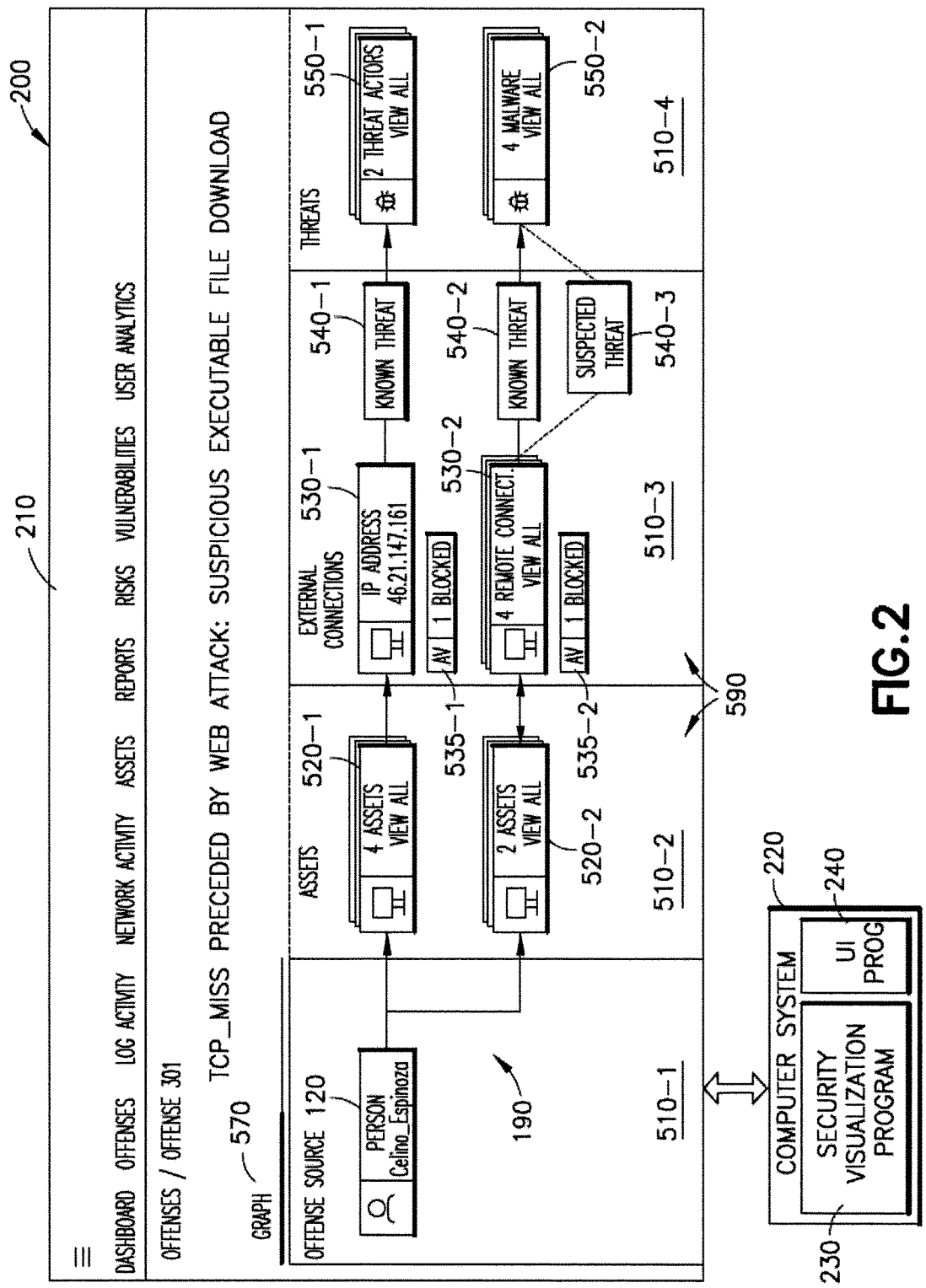
FIG. 2 illustrates a knowledge graph visualization in accordance with an exemplary embodiment.

Using this metaphor, the inventors of exemplary embodiments herein produced several different concepts, one of which featured the use of four "swim lanes." FIG. 2, which illustrates a knowledge graph visualization 590 in accordance with an exemplary embodiment, shows swim lanes 510, which are different areas of the visualization embodied in the UI based on types. This illustrates the previous knowledge graph 190 but visualized in accordance with an exemplary embodiment herein. The swim lanes are the following: swim lane 510-1, corresponding to the alert source (of the node/icon 120, the person Celino_Espinosa); swim lane 510-2, corresponding to assets, with a group of four assets 520-1 and a group of two assets 520-2; swim lane 510-3 of external connections of 530-1, which is an IP address of 46.23.147.161, and 530-2, which is four (4) remote connections, and also two indications of threat relationships 540-1 and 540-2; and swim lane 510-4 of threats, which includes threats 550-1 of two threat actors and threats 550-2 of four malware. In more detail, reference 540 indicates an edge (e.g., a link) from external connections 530 (e.g., as nodes) to threats 550 (which also may be nodes) and shows the relationship between the external connections and threats. The "Known Threat" label for the edges for threat relationships 540-1 and 540-2 is showing the type of the edge. So, the external connections (e.g., nodes) 530 are known to be associated with the threats 550, and reference 540 is showing this relationship. There is also a "Suspected Threat" type edge, which is shown as threat relationship 540-3. This would be used instead of "Known Threat" as in reference 540-2 if the system was not 100 percent (%) certain the nodes 530 were associated with threats 550, but in this case, the system was 100% certain of the relationship. The "Suspected Threat" is shown with dotted lines to indicate it is a possibility, but the example of FIG. 2 (and other figures) assumes the threat is known, so "Suspected Threat" is not used. Also, this example uses 100% certainty, but a smaller threshold (e.g., 90%) or another criterion could be used.

The threats are in the threats swim lane 510-4, and are the ones labeled "2 Threat Actors" and "4 Malware" in this example. The supported threat types are, e.g., Threat Actor, Malware, Reputation, and Threat Campaign, and these will only be shown in the threats swim lane 510-4. The label "Known Threat" is showing the relationship (edge type or the type of the link) between the external connections (e.g., nodes) 530 and corresponding threats 550. The edge type can be a Known Threat (e.g., in response to a confidence of detection being high) or a Suspected Threat (in response to the confidence of detection being low).

The external connections 530-1 and 530-2 in the swim lane 510-3 have corresponding indications 535-1 and 535-2 that one (1) AV (AntiVirus) signature has been detected and blocked by an AV system. The UI 210 also shows that this visualization 590 is for offenses and offense 301, and the user has selected the graph view 570, which is illustrated by this figure. The "offense 301" a unique identifier for the offense being looked at. Also, "offense" is one possible term for a security alert or other potential security incident, and these are referred to herein as security alerts. The visualization 590 shows a short text description of the alert, which provides some indication as to the potential security violation.

This visualization 590 of knowledge graph data addresses a primary reason why so many security analysts using knowledge graphs find them so very difficult to interpret, namely the absence of a structured flow through the nodes and edges. With traditional visual representations of a security incident knowledge graph, there really is no easy way to follow the path from the source of the incident to the possible threat, due to the many interrelated branches.

In contrast to existing visualization, this new way of visualizing a knowledge graph 190 reduces complexity by clustering (also referred to as grouping) related entities together. Related entities that can be clustered together are determined not only by the type of the entities but also by the threats impacting them. These are separated by and correspond to the swim lanes 510. The new graph representation (illustrated as visualization 590) also provides an easy-to-follow path starting from the source of the security incident—typically a user or an internal asset or an external entity—and leading to the threat that allows the security analyst to quickly identify how the security breach proceeded through their network. In the example of FIG. 2, the source is indicated by the node/icon 120 and indicates a person of Celino_Espinosa and ends at the threats 550 in swim lane 510-4. And, finally, the new graph representation reduces the clutter of the old diagram by allowing security analysts to selectively expand clusters on which they would like to see more details.

In this example, the swim lanes 510 are the columns (currently labeled: source, assets, external connections, and threats). Rows are not swim lanes in this example, but the components of the rows are organized into the columns based on their types. For example, if there is a row made up of an asset cluster and a threat, then asset cluster will be placed in the asset column (as a swim lane 510-2) in that row and the threat will be placed into the threat column (as a swim lane 510-4), and the external connection column (as swim lane 510-3) will be empty for that row.

In effect, this new diagram quickly provides analysts with the answers to their questions by mimicking their workflow and aligning with their mental model of how attacks work. The diagram makes clear what the source of the security alert and attack is and where the analyst should start the investigation. Also made explicit are the internal assets 520 that are involved in the security incident. The diagram also identifies any external connections 530 that were made to any suspicious or malicious URLs or IP addresses, and clearly calls out if network security devices did or didn't block the threat. In this case, two connections are blocked, as indicated by references 530-1 and 530-2. Payload information is available from within the diagram, as is additional information about all of the entities and their relationships to each other. Lastly, the type of threat and its success or failure in compromising the network is clearly communicated. It is noted that it is possible for all the from the old knowledge graph 190 (of FIG. 1) to be reachable using FIG. 2.

With this new visualization 590, the knowledge graph provides analysts with all the puzzle pieces they need to make a quick assessment if a security alert represents a false positive or a real threat.

In order to create the visualization 590, the security visualization program 230 of the computer system 220 processes the knowledge graph 190 and corresponding data. The source of the incident is determined by the STEM that reported the security incident and can be any node such as an internal user, an internal IP address, an external connection endpoint, a rule that triggered the alert, and the like and is used to provide a starting point for visualizing the incident.

Note that offense source, asset, external connections, and threats are the only swim lanes when visualizing an offense for one example. These swim lanes 510 are picked based on what is most important to the consumer of the graph, in this case, a security analyst. So, these examples are very specific to this one use-case of security alert/incident visualization. However, the same graph concepts can be used to visualize different concepts/use cases in different problem domains, and the swim lane names can be adjusted based on that problem domain.

FIG. 3 is a method of processing input knowledge graph data to make the data more useful for subsequent visualization via a grouped graph data structure. For instance, the data could correspond to the input knowledge graph 190 and particularly to the source of the incident, which is illustrated in FIG. 2 by node/icon 120. The steps and sub-steps are numbered and are illustrated in FIG. 3, which is split into FIGS. 3A, 3B, 3C, 3D, and 3E. The blocks in this figure are performed by the computer system 220, e.g., under control of the security visualization program 230 and UI program 240 in some examples. The processing results in an exemplary embodiment in a grouped graph data structure that is then used to display a knowledge graph visualization 590 as in FIG. 2.

In step 1 of FIG. 3, the security visualization program 230 gets all nodes in an input knowledge graph 190, e.g., using a commercially available or open-source graphing library to perform the following.

a. Make a list of all knowledge graph nodes that represent internal assets (servers, desktops, mobile devices, and the like) using the node type and attributes available on the nodes of the input knowledge graph 190. For example, node type IP Address with an attribute showing the type of the IP Address as an internal asset should be available on the input graph 190.

b. Make a list of all knowledge graph nodes that represent external connection endpoints (e.g., external IP addresses, URLs) using the node type and attributes available on the nodes of the input knowledge graph. For example, a node-type IP address with an attribute showing the type of the IP Address as external should be available in the input graph 190.

c. Make a list of all knowledge graph nodes that represent a threat using the node type. The node types such as Malware Family, Threat Actor, Threat Campaign, and Anti-virus Signatures are considered to be nodes that represent a threat.

d. Make a list of all knowledge graph nodes that represent a Reputation using the node type. IP address, URL, and domain type nodes can have Reputation nodes attached to them to indicate their known reputation obtained from a threat intelligence source. For example, a malicious IP address can have a reputation Spam Generator or Anonymizer, or the like. A malicious URL can have a reputation for being a malware distribution site, infection source, or the like. A non-malicious URL can have a reputation such as Educational, Business, or the like. In more detail, reputation is a type of threat node, and these are shown in an exemplary embodiment in the threats swim lane (see 510-4 of FIG. 2). The example swim lane graph does not show a reputation node, but possible types of threat nodes that can be shown in threat swim lane include the following in one example: Malware, Threat Actor, Threat Campaign, and Reputation. Reputation will have labels/names explaining what the reputation is, e.g., some examples are as follows: "Known Infection Source" or "Spam generator" or "Malware Distributor."

Step 2, described below, determines which assets are impacted by what threats. This is performed by assigning unique IDs to threats and tagging the impacted assets by that ID—this aids in determining how to cluster the items later. For example, if five different assets are all impacted by two different threats, then five assets can be grouped into one cluster and two threats grouped into one cluster, and an edge drawn between the two. This helps to determine how many rows/branches of the graph can be reduced to one row and therefore reduce visual clutter.

In step 2 of FIG. 3, for each threat node and internal asset node combination, the security visualization program 230 performs the following exemplary steps:

a. Find all paths between the internal asset node and the threat node, e.g., using a third-party graph library such as networkx.

b. Discard all invalid paths, e.g., if a path includes more than one internal asset node or includes more than one relationship that represents a remote connection, it is discarded as invalid.

c. Move onto a next threat/asset pair if there is no valid path between the current pair; otherwise, continue to step d.

d. Generate a unique id and assign the unique id to the current threat node as a threat group id.

e. Mark all the nodes in the valid paths between the threat and asset as potential candidates for the threat group id, e.g., by adding a temporary attribute to the nodes that contain the threat group id.

In step 3 of FIG. 3, once all nodes are marked with their potential threat group ids, the security visualization program 230 determines how to group them using the following exemplary steps.

a. If a node is only assigned a single potential threat group id, the node is added to the group for that threat based on its type. This is the type of the node, i.e., if a node is a type "asset," the node goes into an asset cluster; otherwise, the node goes into an external connect cluster. As another example, if a threat group id of a node is 1 (one), internal assets are assigned to AssetThreatGroup1, and external connect endpoints are assigned to ExternalConnectGroup1.

b. If a node is assigned more than one potential threat group id (e.g., because the node has a valid path to more than one threat), determine which threat is more important. For example, a Malware Family type threat node is considered more important than a Threat Actor type threat node, as the Malware Family type threat node provides more specific information about the security incident and the potential impact of the incident.

i. The nodes are assigned to the threat group for the most important threat if the most important threat can be determined.

ii. If all threats are of equal importance, then the threat nodes themselves are grouped together into a single threat group, and all the nodes that have the grouped threat ids are assigned to that threat group based on their type.

In step 4 of FIG. 3, the security visualization program 230 gets the list of all reputations (e.g., identified in step 1.d above) and groups them based on their parent node groups and includes them as attributes of the parent group, instead of as separate nodes.

In step 5, the outputs of step 3 (e.g., one or more groups of internal assets, external connections, and threats) are then assigned to their respective swim lanes 510 by the security visualization program 230 via the following. Note that this example places the swim lanes in columns, as illustrated in FIG. 2, but this is merely one example, and other techniques (e.g., rows) could be used. Note also that the swim lanes align with the swim lanes 510 of FIG. 2, but these swim lanes 510 are merely exemplary, and others might be used.

a. If the source of the security incident (i.e., the root of the original knowledge graph 190) is not included in one of the groups created (for example, if the source is a user instead), then the source is assigned to the 'Offense Source' swim lane 510-1. Otherwise, a separate 'Offense Source' swim lane is not added. In this case, the source might be marked using a different colored highlight around the source node, as one possible example.

b. Each asset group is assigned to the 'Asset' swim lane 510-2 by setting their column id attribute to the asset column id. If there is more than one asset group, then a row id attribute is also assigned to each to help the UI program 240 (e.g., under the direction of the security visualization program 230) to show the groups in a predetermined order.

c. Each external connect group is assigned to the 'External Connection' swim lane 510-3 by setting their column id attribute to the external connect column id. The row id for each external connect group is set to match the row id for their respective asset groups.

d. Each threat group is assigned to the 'Threats' swim lane 510-4 by setting their column id attribute to the threats column. The row id for each threat is set to match the row id for their connected asset groups.

In step 6 of FIG. 3, all groups are written to a file as (e.g., JSON) super nodes along with the original unmodified knowledge graph 190 by the security visualization program 230 as follows. Note that this step saves the graph representation to a file in, e.g., JSON format, so the representation can be reloaded and visualized any time from the UI component (e.g., the UI program 240, producing information on the UI 210).

A super node is a cluster of other nodes. A super node is usually made up of multiple nodes and can be expanded to see all the nodes that are included in it. However, there are cases when a super node cannot be expanded. This can happen when the multiple nodes that make up the super node are of different types, and in that case (in an exemplary embodiment), the details may be shown in a side panel when the super node is selected instead of expanding the super node in the graph. Regarding super nodes, even if an element only has a single item (e.g., a node), a "super node" is created for this element in an exemplary embodiment. This simplifies the implementation by not mixing nodes and super nodes in the same view and helps the code to be more generic. Also, even if one item is single, this item can have an edge to a cluster (a super node) and will need, in an exemplary embodiment, to be connected by a super edge (a cluster of edges that have been consolidated into a single edge) to the item. Non-super nodes cannot have super edges in one exemplary implementation.

a. One of the nodes in the group/cluster is selected as the lead node, and its label is used as the super node's display label. The importance of assets or maliciousness of external connects and/or threats are considered when picking the lead node. The importance of assets can be obtained from an external source, such as the company asset database. In this case, it is assumed that the importance is already captured in the original graph that is being converted into the swim lanes 510.

b. The rest of the nodes in the group are stored as references to the nodes in the original Knowledge Graph, to allow the UI components to expand the super nodes to display the rest of the grouped/clustered nodes within the super node.

In step 7 of FIG. 3, super edges are created between the super nodes and written to a file (e.g., as JSON) by the security visualization program 230 as follows.

a. 'External Connection' type super edges are created between each asset super node and their corresponding 'External Connection' super nodes. These edges are directed, and the direction corresponds to the direction of the grouped network connections (from the source of connection to the destination of connection). The edge can be bidirectional if the grouped connections are in both directions.

b. 'Known Threat' type super edges are created between assets and/or external connects and threat groups, in the case where all indicators leading to the threat were actually observed (e.g., seen) by the organization's network security controls. These edges are not directed and indicate that the external connect group is known to be associated with the threat or asset group is known to be impacted by the threat.

c. 'Suspected Threat' type super edges are created between assets and/or external connects and threat groups, in the case where all indicators leading to the threat were not actually observed by the organization's network security controls but inferred through threat intelligence. These edges are not directed and indicate that the external connect group is suspected to be associated with the threat or asset group is suspected to be impacted by the threat.

d. The original edges between the grouped nodes of each super node are stored as references to the edges in the original knowledge graph, to aid the UI program 240 (e.g., under control of the security visualization program 230) when expanding the super nodes (e.g., via user interaction with corresponding icons).

In order to create the user interface 210 for the graph 190 and its knowledge graph visualization 590, it is beneficial to meet one or more of the following requirements.

1) Allow the ability to style or customize nodes and edges based on different attributes, which allows integration with modern front-end libraries.

2) Provide the ability to position nodes on the graph, depending on their row and column values. Note that in the examples herein, the columns correspond to swim lanes 510, though this is merely exemplary.

3) Prevent edges from overlapping on both nodes and other edges.

4) Provide the ability to cluster (e.g., concentrate) edges.

5) Provide the ability to cluster and expand nodes, and to update edges based on these changes.

Figure 5:
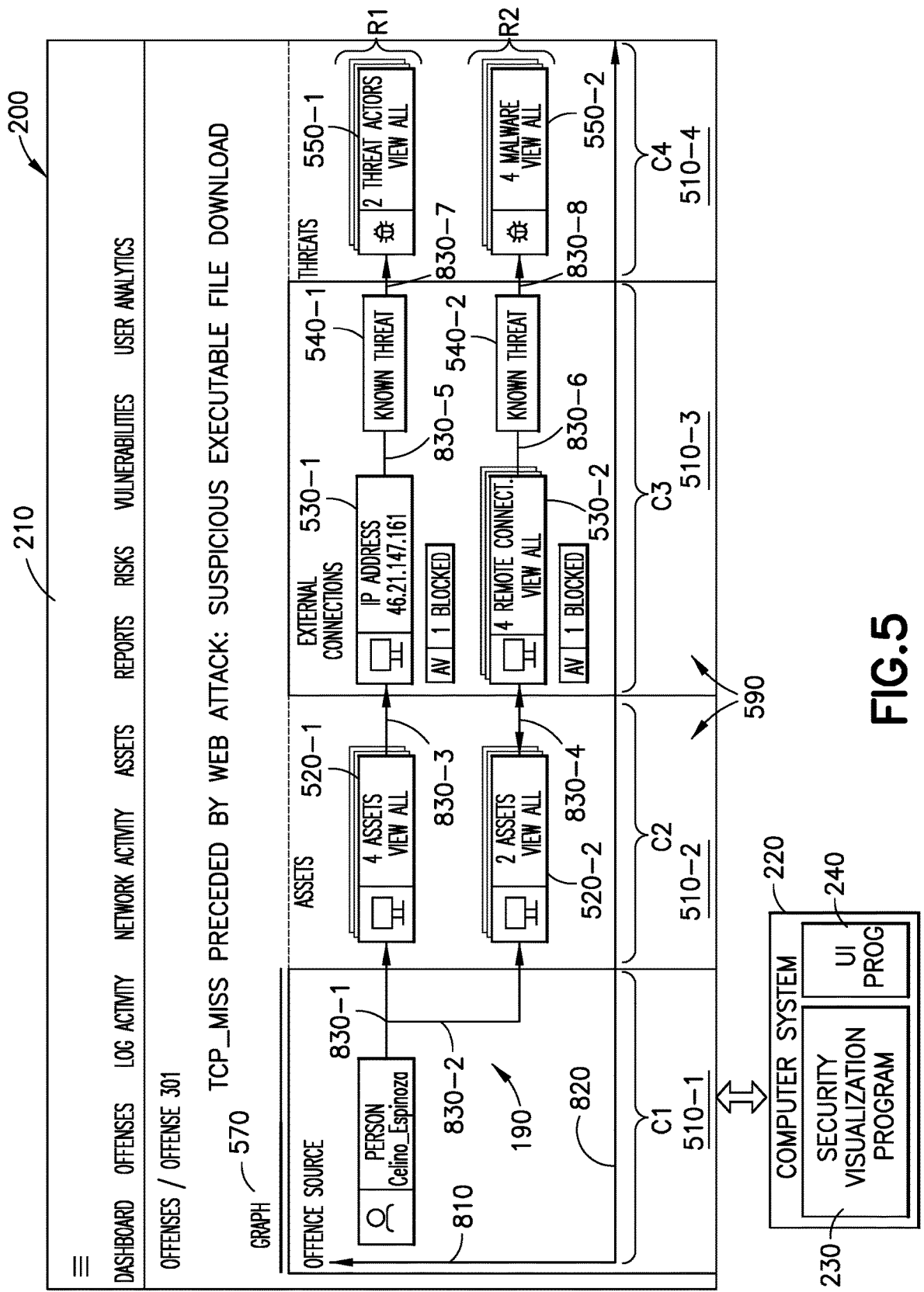
FIG. 5 is a knowledge graph visualization from FIG. 2 with additional information on the visualization in accordance with the method of FIG. 4.

Laying out nodes and edges are now described. FIG. 4, split into FIGS. 4A and 4B, is a method of laying out nodes and edges to create a knowledge graph visualization in accordance with an exemplary embodiment. Meanwhile, FIG. 5 is a knowledge graph visualization from FIG. 2 with additional information on the visualization in accordance with the method of FIG. 4. In FIG. 5, most of the reference numerals of elements in the knowledge graph 190 have been removed for ease of reference. The method of FIG. 4 is performed by a computer system 220, e.g., under control of the security visualization program 230. Reference should be made to FIG. 4 or 5, as appropriate.

The method in FIG. 4 involves processing (block 705) the grouped graph data structure that was created by the method of FIG. 3, for outputting visualization data. Each of the drawing or rendering steps below (e.g., blocks 750, 755, 765, 775), for instance, produces visualization data. This visualization data could be suitable for immediate display on a display 200, for sending to a computer system for display there, for display via a webpage (e.g., where the visualization data is written in HTML, javascript, or other suitable languages), or for any other technique that allows the display of the visualization data.

In block 710 of FIG. 4, nodes are placed on a graph given fixed X and Y coordinates. This can be achieved by creating an X and Y scale using a commercially available, open-source, or other libraries, and by passing in row and column values to these scales. In the examples herein, there are four columns and two rows. These values are used to define a scale, and then X and Y positions are calculated for individual nodes on the graph. One possible library to use is d3, which is a JavaScript library for manipulating documents based on data.

For instance, in FIG. 5, there is a Y-axis 810 and an X-axis 820, each of which has a corresponding scale (as indicated by the length of each corresponding line for an axis), which can be dictated by the amount of screen area on UI 210 on display 200 to be used for the display of the knowledge graph 190. In an exemplary embodiment, the X and Y scales are not dictated or influenced by the size of UI 210. Instead, the X and Y scale's maximum pixel values are determined by the range of rows and columns. If the knowledge graph 190 is larger than UI 210, the user can drag the graph area to scroll. In the example of FIG. 5, this is not an issue, as the area fits within the UI 210. There are two rows R1 and R2 and four columns C1, C2, C3, and C4. Each of the columns will (e.g., after being placed on the UI 210) correspond to a swim lane 510-1, 510-2, 510-3, and 510-4. Each of the rows R1 and R2 corresponds to a different branch through the graph 190, where each branch corresponds to one known (e.g., or suspected) threat.

In block 720 of FIG. 4, edges 830 of FIG. 5 are generated by drawing lines between X and Y coordinates of the source nodes and target nodes. The edges 830-1, 830-2, 830-3, 830-4, 830-5, 830-6, 830-7, and 830-8 are shown between their corresponding source node and a target node. The threat relationships 540-1, 540-2 may also be added. Note that some of these nodes are super nodes, meaning the super nodes correspond to a group. For instance, the two assets 520-2 correspond to a super node, but the external connection 530-1 has only a single node. In one example, a swim lane graph is made up of super nodes, even if a super node only corresponds to a single node underneath. This is to make it easier to visualize the graph without having to support handling mixed types of nodes. This is only one option, however, and other options may be used.

In order to prevent lines from intersecting with both nodes and other lines, a pathfinding technique might be used in an exemplary embodiment. See block 730 of FIG. 7. In an exemplary embodiment, publicly available pathfinding algorithms are used. One such algorithm that might be used is referred to as A* (see theory.stanford.edu/~amitp/GameProgramming/AStarComparison.html), though this is exemplary. Pathfinding is achieved by subdividing the entire graph into a grid of cells. See block 735 of FIG. 7. The nodes are looped through, and a cost is assigned to each cell covered by a node. A smaller cost is assigned around said nodes to achieve padding. See block 740. A cost (also referred to as a weight) is assigned (block 740) to each cell created in block 735 of FIG. 7. The pathfinding algorithm attempts to find the best path between nodes by traversing neighboring cells. Cells with higher costs will be less favorable than ones with lower costs. Cells that are occupied by nodes will have a higher cost associated with them than those that are not occupied by nodes.

In block 745, the edges are looped through and a cost to cells in which an edge has passed through. This may use the same pathfinding algorithm as previously described. Costs are adjusted, e.g., by adding some additional logic for edges for collinear (or concentrated) edges. For example, where the source node is the same as a previous edge, the previous cost may be ignored, and the line is allowed to be drawn on the same cell.

Initially, the nodes are clustered, as illustrated in FIG. 5. That is, for each node/icon in the visualization 590 indicated as having multiple underlying entities, these are groups that are clustered into super nodes. See the following super nodes: 4 assets 520-1; 2 assets 520-2; 4 remote connections 530-2; 3 threat actors 550-1; and 4 malware 550-2. In block 750 of FIG. 4, while initially rendering the graph, only "super edges" and "super nodes, "which are clustered groups of edges and nodes, are drawn. As previously described, a swim lane graph is made up of super nodes, even if a super node only corresponds to a single node underneath. This is to make it easier to visualize the graph without having to support handling mixed types of nodes.

In block 760, the security visualization program 230 determines whether a super node has been expanded or contracted. When a super node is expanded (block 760=expanded), the child nodes are rendered to the graph in block 765. This may involve (block 770) calculating the tallest adjacent cluster to the current expanded super node's row, and recalculating the X and Y coordinates of the nodes and super nodes below the expanded node.

Figure 6:
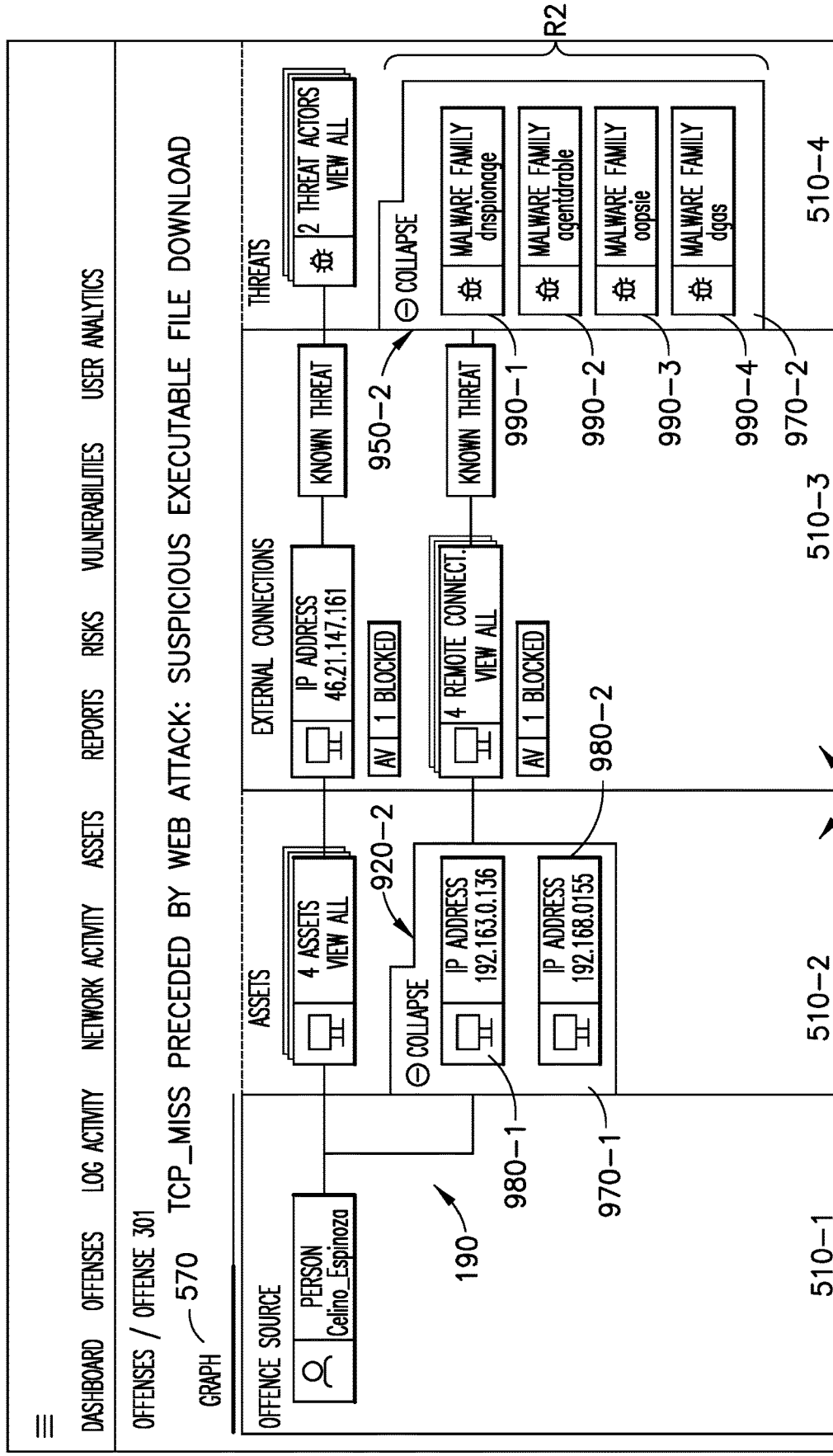
FIG. 6 is a knowledge graph visualization from FIG. 2, where certain super nodes have been expanded in accordance with the method of FIG. 4.

Turning to FIG. 6, this figure illustrates a knowledge graph visualization from FIG. 2, where certain super nodes have been expanded in accordance with the method of FIG. 4. The knowledge graph 190 is illustrated in the knowledge graph visualization 590, where two super nodes 920-2 and 950-2 have been expanded. Super node 920-2 corresponds to the group of 2 assets 520-2, and the super node 950-2 corresponds to the group of 4 malware 550-2. If a user clicks on the icon corresponding to the group of 2 assets 520-2, the security visualization program 230 expands the super group 920-2 as indicated, where resultant folder view 970-1 also indicates the asset 980-1 of IpAddress 192.168.0.130 and the asset 980-2 of IpAddress 192.168.0.155. In response to a user clicking on the icon for the group of four malware 550-2, the resultant folder view 970-2 illustrates the following malware: MalwareFamily dnspionage 990-1; MalwareFamily agentdrable 990-2; MalwareFamily oopsie 990-3; and MalwareFamily dgas 990-4. The row R2 has been expanded relative to FIG. 5 because of the amount of space required to view the expanded super node 950-2. Put differently, the visualization data used to represent the row R2 has been revised to provide an expanded view of the elements in row R2 and specifically the expanded super node 950-2.

Returning to FIG. 4, similar logic may be used when expanding and collapsing super nodes. For example, if a super node has been expanded and then subsequently collapsed (Block 760=collapsed), the security visualization program 230 returns to a "super node" view (e.g., FIG. 5) in block 775. In both cases (expanding and collapsing), the tallest adjacent expanded cluster is found. When a super node is expanded, the tallest expanded cluster is found, and nodes are adjusted in subsequent rows down. When a super node is collapsed, the same function may be found to find the tallest adjacent cluster. If the tallest expanded cluster has changed (e.g., because another, the formerly tallest cluster has been collapsed in this example), the nodes in subsequent rows are adjusted again. This may be performed by (see block 780) calculating the tallest adjacent cluster to the current expanded super node's row and recalculate the X and Y coordinates of the nodes and super nodes below the expanded node.

Regarding integration with libraries, the above combination of positioning and pathfinding techniques and also clustering/expanding/collapsing logic can, in theory, be applied with any programming language, including with modern javascript libraries that allow for the styling of nodes and edges.

Regarding existing techniques and their issues, multiple examples of graphing libraries and graphing techniques exist in various programming languages. Listed below are notes on existing techniques and their abilities and limitations.

Techniques used in DAG (Directed Acyclic Graph) libraries are effective in preventing overlapping edges, but dynamically place nodes using layered drawing. Meanwhile, the instant techniques herein required the ability to manually place the X and Y values of nodes while also preventing edges from overlapping other edges.

Other libraries can achieve fixed node positioning (using certain layouts), prevent edge overlaps, and support concentrating edges. These libraries, however, do not integrate well with modern front-end libraries.

Figure 7:
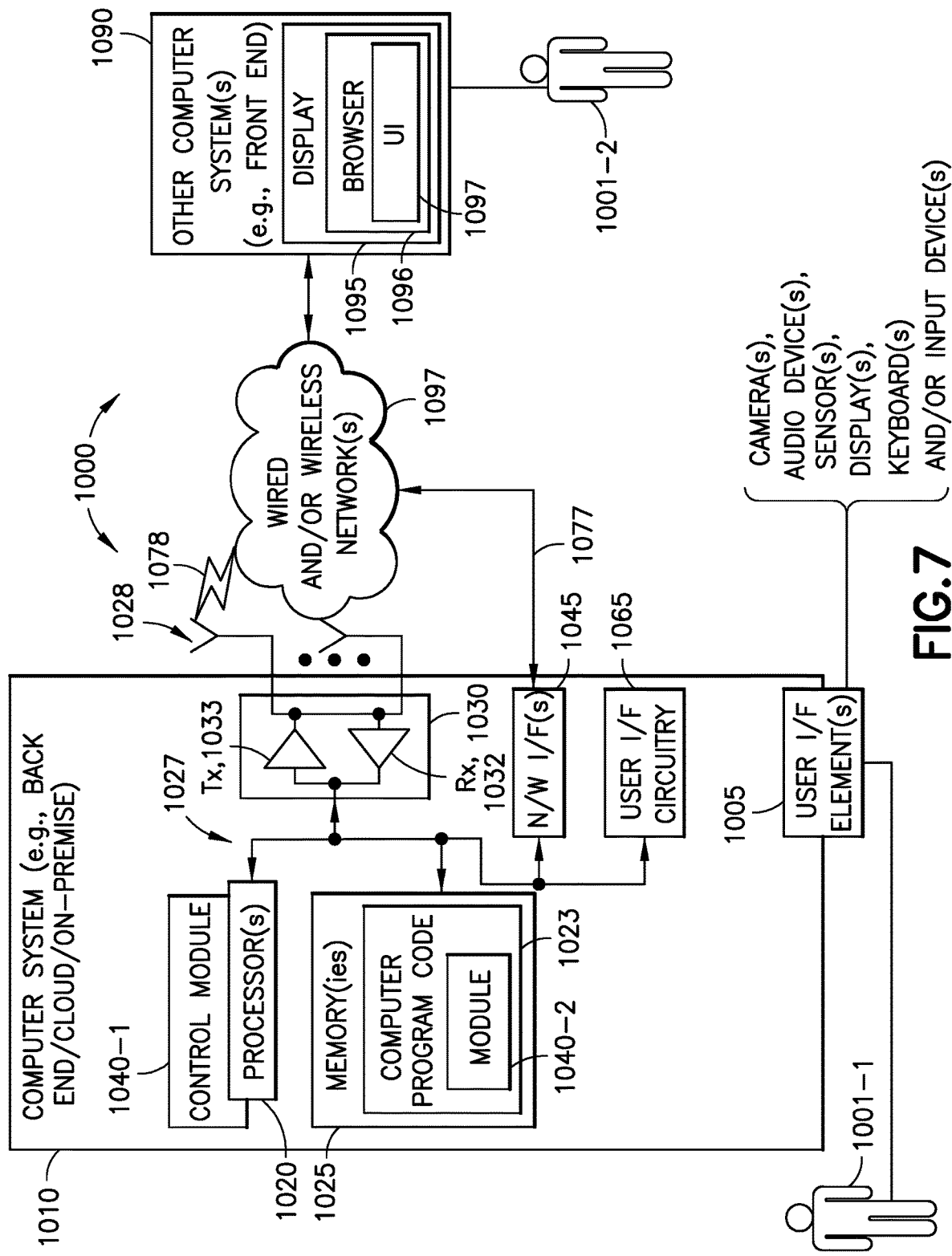
FIG. 7 is an example of systems in which the exemplary embodiments might be practiced.

Turning to FIG. 7, this figure is an example of systems 1000 in which the exemplary embodiments might be practiced. The computer system 1010 comprises the following: one or more processors 1010; one or more memories 1025; network (N/W) interface(s) (I/F(s)) 1045, one or more transceivers 1030 having one or more antennas 1028, all interconnected through one or more buses 1027. The computer system 1010 may also include one or more user I/F elements 1005, such as camera(s), audio device(s), sensor(s), display(s), keyboard(s), and/or other input device(s) (such as trackballs, mice, touchscreens, and the like).

The one or more buses 1027 may be address, data, or control buses, and may include any interconnection mechanism, such as a series of lines on a motherboard or integrated circuit, fiber optics or other optical communication equipment, and the like. The one or more memories 1025 include computer program code 1023. The computer system 1010 includes a control module 1040, comprising one of or both parts 1040-1 and/or 1040-2, which may be implemented in a number of ways. The control module 1040 may be implemented in hardware as control module 1040-1, such as being implemented as part of the one or more processors 1020. The control module 1040-1 may also be implemented as an integrated circuit or through other hardware such as a programmable gate array. In another example, the control module 1040 may be implemented as control module 1040-2, which is implemented as computer program code 1023 and is executed by the one or more processors 1020. For instance, the one or more memories 1025 and the computer program code 1023 may be configured to, with the one or more processors 1020, cause the computer system 1010 to perform one or more of the operations as described herein.

The computer system 1010 may communicate with one or more wired and/or wireless networks via one or both of wireless link 1078 or wired link 1077. Another computer system 1090 may also be used, comprising a display 1095, a browser 1096, and a UE 1097. Users 1001 may interact with one or both of the computer system 1010 (user 1010-1) or computer system 1090 (user 1001-2).

In one example, the computer system 1010 is an on-premise computer system similar to what is illustrated by computer system 220 of the previous figures. In this case, the security visualization program 230 and the UI program 240 can be implemented as the control module 1040, and a user 1001-1 interfaces with the computer system 1010 through user I/F elements such as the display 200, which shows the UI 210.

In another example, the entire system 1000 may be on-premises, such that a user 1001-2 uses a front-end computer system 1090 to connect via the network(s) 1097 with a back-end computer system 1010. In this example, the display 1095 could be the display 200 of the previous examples, and the UI 1097 could be the UI 210 and displayed by or as part of the browser 1096. The back-end computer system 1010 has the security visualization program 230, and the UI program 240 implemented as the control module 1040 and creates output to display the UI 1097/210 on the display 1095.

As another example, the system 1000 may be in separate locations, and the user 1001-2 can connect via the one or more networks 1097 (e.g., the Internet) to the computer system 1010, which then has the security visualization program 230 and the UI program 240 implemented as the control module 1040, and creates output to display the UI 1097 on the display 1095. The computer system 1010 may be implemented in the cloud, for instance, and the visualization could be offered as a service. The computer system 1010 could also be a server and the computer system 1090 a client, as another example of a possible implementation.

The present invention may be a system, a method, and/or a computer program product. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
accessing information for a knowledge graph, the knowledge graph having nodes and edges of a network and having information regarding one or more security incidents in the network;
grouping together related entities from the knowledge graph, where the related entities that are grouped together are determined by types of the entities, and also by one or more threats impacting the entities, wherein the one or more threats correspond to the one or more security incidents, wherein grouping together related entities from the knowledge graph further comprises grouping nodes having same types and same threats into one or more corresponding super nodes having one or a group of nodes and grouping edges for the groups of nodes consolidated into the super nodes as super edges, and wherein the types of the entities comprise one or more of the following: one or more assets in the network; one or more external connections from the one or more assets to the one or more threats; and the one or more threats that correspond to assets via the one or more external connections;
arranging the grouped related entities in visualization data in order that the visualization data are configured to provide a visualization of the knowledge graph with the grouped related entities and any corresponding threats impacting the grouped related entities; and
outputting the visualization data.

2. The computer-implemented method of claim 1, wherein the types of entities further comprise one or more security alert sources.

3. The computer-implemented method of claim 1, wherein arranging the grouped related entities in visualization data further comprises providing in the visualization data at least one path starting from a source of a security incident and leading via edges to a threat.

4. The computer-implemented method of claim 1, wherein arranging the grouped related entities in visualization data further comprises arranging super nodes into different areas of the visualization based on the types.

5. The computer-implemented method of claim 4, further comprising arranging the super nodes and corresponding edges into different areas of the visualization based on different threats, the different areas corresponding to different branches of the visualization corresponding to the different threats.

6. The computer-implemented method of claim 5, wherein the different branches of the visualization corresponding to the different threats also comprise indications of threat relationships for edges between the super nodes and corresponding threats, and wherein the indications of threat relationships comprise one or both of known threats or suspected threats.

7. The computer-implemented method of claim 3, further comprising receiving input from a user indicating a selected one of the super nodes is to be expanded, and wherein arranging the grouped related entities in the visualization data further comprises revising the visualization data to provide an expanded view of the super node by rendering child nodes of the super node in the visualization data, and wherein outputting further comprises outputting the revised visualization data.

8. The computer-implemented method of claim 7, further comprising receiving input from a user indicating the selected and expanded super nodes is to be collapsed, and wherein arranging the grouped related entities in the visualization data further comprises revising again the visualization data to remove the expanded view and provide a collapsed view of the super node, and wherein outputting further comprises outputting the revised again visualization data.

9. An apparatus, comprising:
one or more memories having computer-readable code thereon; and
one or more processors, the one or more processors, in response to retrieval and execution of the computer-readable code, causing the apparatus to perform operations comprising:
accessing information for a knowledge graph, the knowledge graph having nodes and edges of a network and having information regarding one or more security incidents in the network;
grouping together related entities from the knowledge graph, where the related entities that are grouped together are determined by types of the entities, and also by one or more threats impacting the entities, wherein the one or more threats correspond to the one or more security incidents, wherein grouping together related entities from the knowledge graph further comprises grouping nodes having same types and same threats into one or more corresponding super nodes having one or a group of nodes and grouping edges for the groups of nodes consolidated into the super nodes as super edges, and wherein the types of the entities comprise one or more of the following: one or more assets in the network; one or more external connections from the one or more assets to the one or more threats; and the one or more threats that correspond to assets via the one or more external connections;
arranging the grouped related entities in visualization data in order that the visualization data are configured to provide a visualization of the knowledge graph with the grouped related entities and any corresponding threats impacting the grouped related entities; and
outputting the visualization data.

10. The apparatus of claim 9, wherein the types of entities further comprise one or more security alert sources.

11. The apparatus of claim 9, wherein arranging the grouped related entities in visualization data further comprises providing in the visualization data at least one path starting from a source of a security incident and leading via edges to a threat.

12. The apparatus of claim 9, wherein arranging the grouped related entities in visualization data further comprises arranging super nodes into different areas of the visualization based on the types.

13. The apparatus of claim 12, wherein the one or more processors, in response to retrieval and execution of the computer-readable code, cause the apparatus to perform operations comprising arranging the super nodes and corresponding edges into different areas of the visualization based on different threats, the different areas corresponding to different branches of the visualization corresponding to the different threats.

14. The apparatus of claim 13, wherein the different branches of the visualization corresponding to the different threats also comprise indications of threat relationships for edges between the super nodes and corresponding threats, and wherein the indications of threat relationships comprise one or both of known threats or suspected threats.

15. The apparatus of claim 11, wherein the one or more processors, in response to retrieval and execution of the computer-readable code, cause the apparatus to perform operations comprising receiving input from a user indicating a selected one of the super nodes is to be expanded, and wherein arranging the grouped related entities in the visualization data further comprises revising the visualization data to provide an expanded view of the super node by rendering child nodes of the super node in the visualization data, and wherein outputting further comprises outputting the revised visualization data.

16. A computer program product comprising a computer-readable storage medium having program instructions embodied therewith, where the program instructions are executable by a computer system to cause the computer system to perform operations comprising:
  accessing information for a knowledge graph, the knowledge graph having nodes and edges of a network and having information regarding one or more security incidents in the network;
  grouping together related entities from the knowledge graph, where the related entities that are grouped together are determined by types of the entities, and also by one or more threats impacting the entities, wherein the one or more threats correspond to the one or more security incidents, wherein grouping together related entities from the knowledge graph further comprises grouping nodes having same types and same threats into one or more corresponding super nodes having one or a group of nodes and grouping edges for the groups of nodes consolidated into the super nodes as super edges, and wherein the types of the entities comprise one or more of the following: one or more assets in the network; one or more external connections from the one or more assets to the one or more threats; and the one or more threats that correspond to assets via the one or more external connections;
  arranging the grouped related entities in visualization data in order that the visualization data are configured to provide a visualization of the knowledge graph with the grouped related entities and any corresponding threats impacting the grouped related entities; and
  outputting the visualization data.

17. The computer program product of claim 16, wherein the types of entities further comprise one or more security alert sources.

18. The computer program product of claim 16, wherein arranging the grouped related entities in visualization data further comprises providing in the visualization data at least one path starting from a source of a security incident and leading via edges to a threat.

19. The computer program product of claim 16, wherein arranging the grouped related entities in visualization data further comprises arranging super nodes into different areas of the visualization based on the types.

20. The computer program product of claim 19, further comprising arranging the super nodes and corresponding edges into different areas of the visualization based on different threats, the different areas corresponding to different branches of the visualization corresponding to the different threats.

* * * * *